June 15, 1937. G. V. ANDERSON ET AL 2,083,680
INTERNAL COMBUSTION ENGINE
Filed Nov. 11, 1933 9 Sheets-Sheet 1

INVENTORS:
GILBERT V. ANDERSON.
ALBERT T. BREMSER.
BY
ATTORNEY.

June 15, 1937.  G. V. ANDERSON ET AL  2,083,680
INTERNAL COMBUSTION ENGINE
Filed Nov. 11, 1933    9 Sheets-Sheet 2
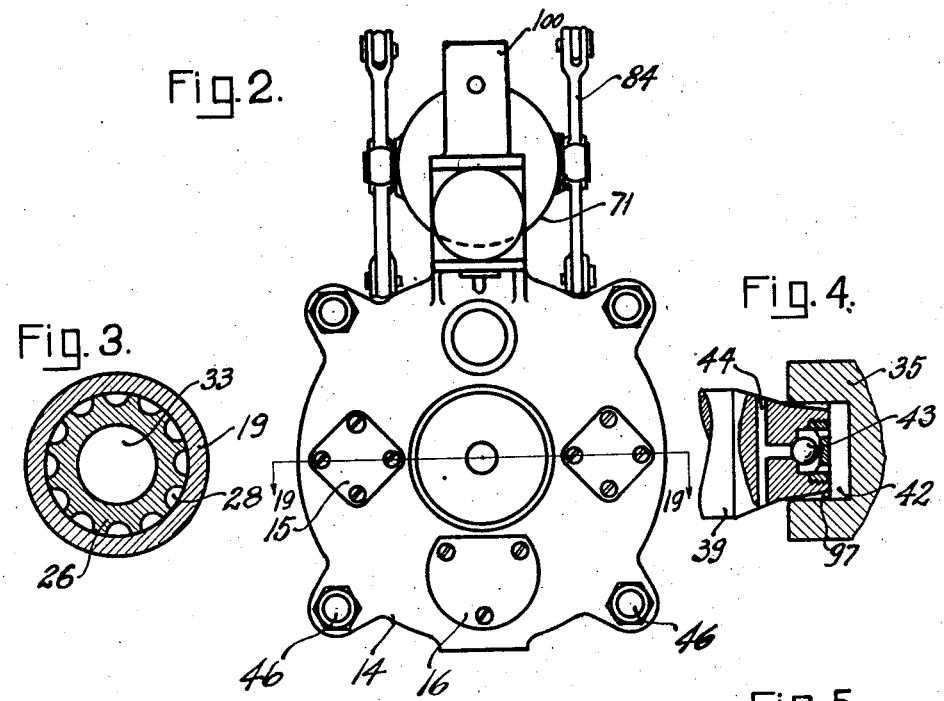
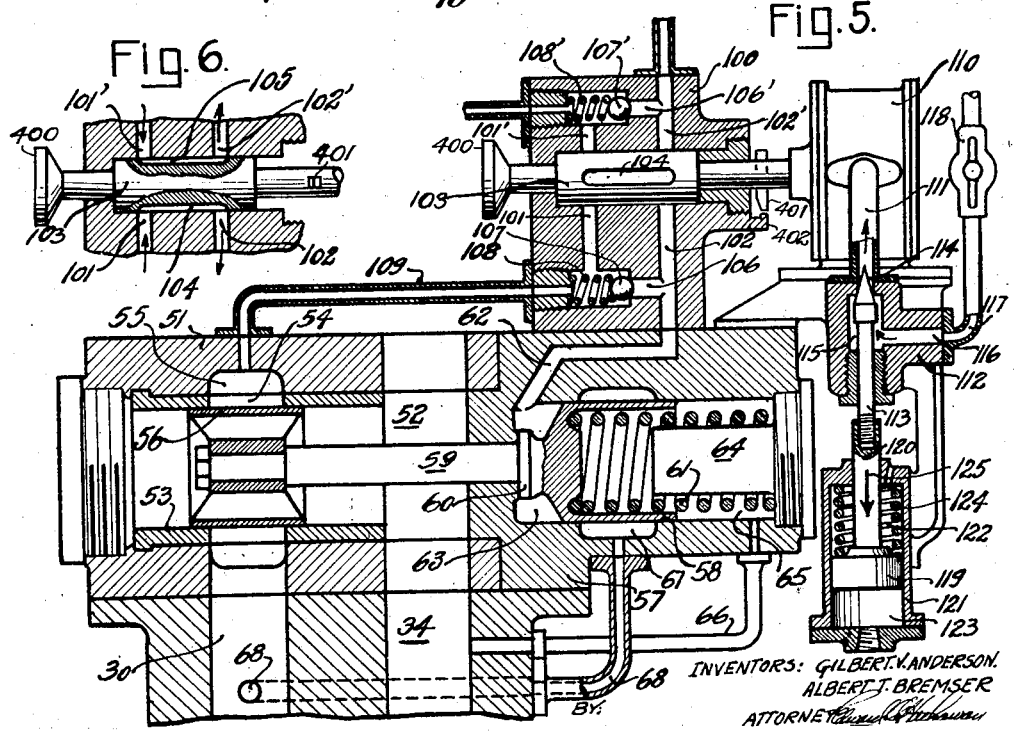
INVENTORS: GILBERT V. ANDERSON.
ALBERT J. BREMSER
BY:
ATTORNE

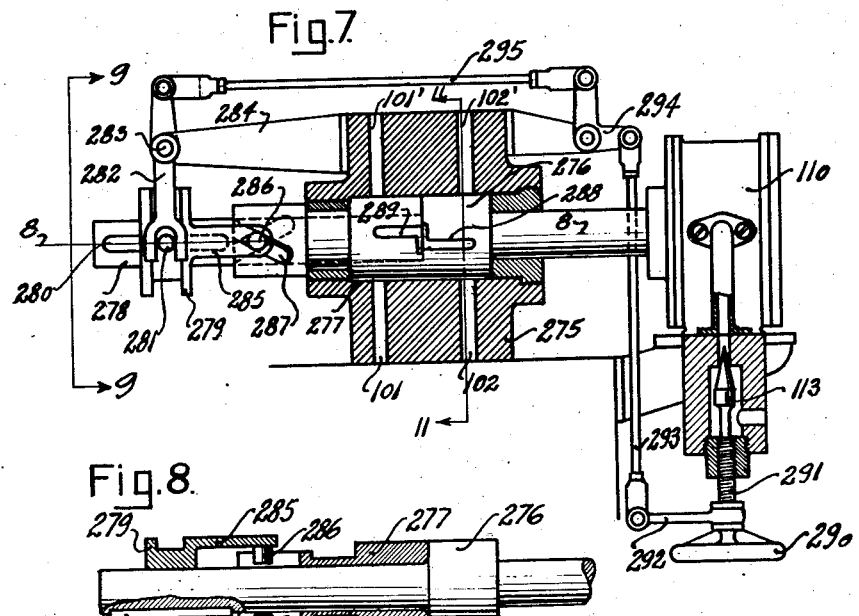

June 15, 1937.   G. V. ANDERSON ET AL   2,083,680
INTERNAL COMBUSTION ENGINE
Filed Nov. 11, 1933   9 Sheets-Sheet 4
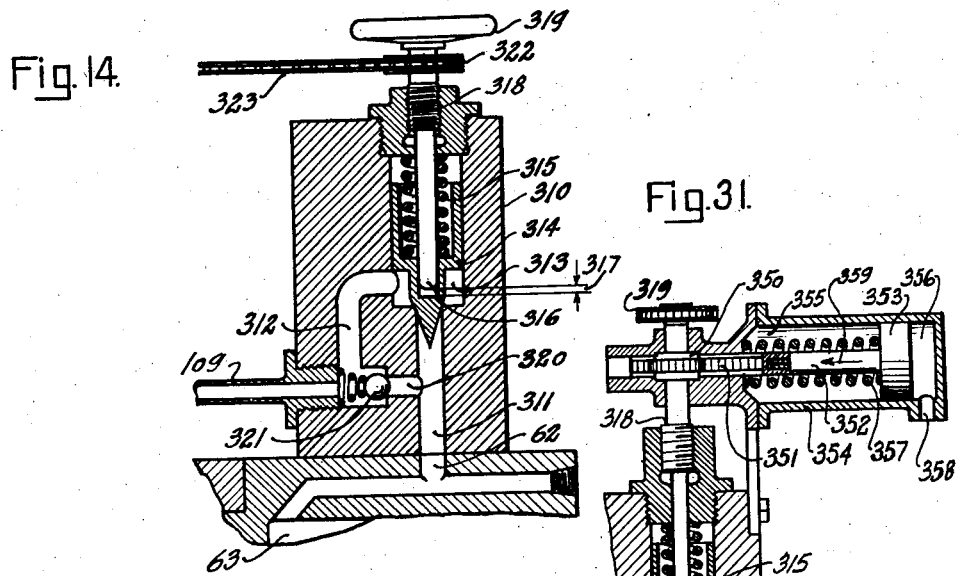
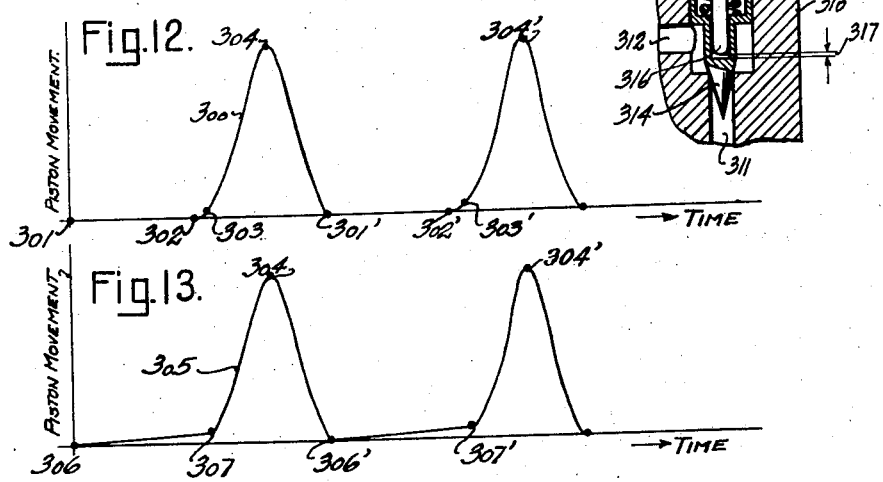
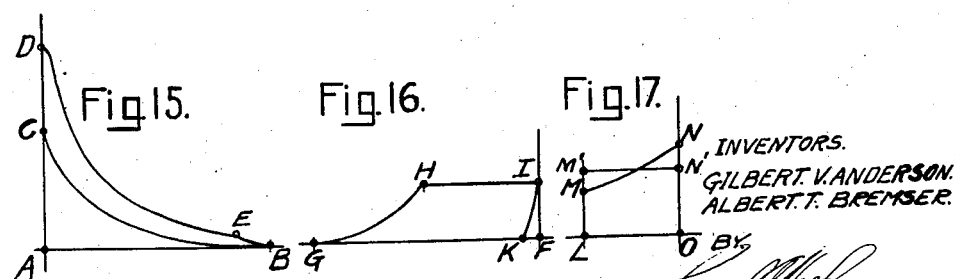
INVENTORS.
GILBERT V. ANDERSON.
ALBERT T. BREMSER.
BY
ATTORNEY.

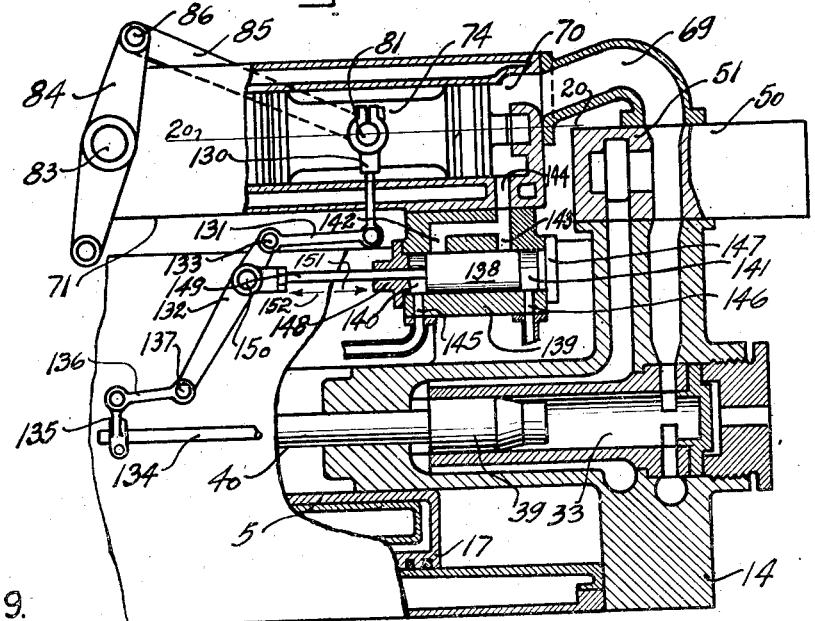

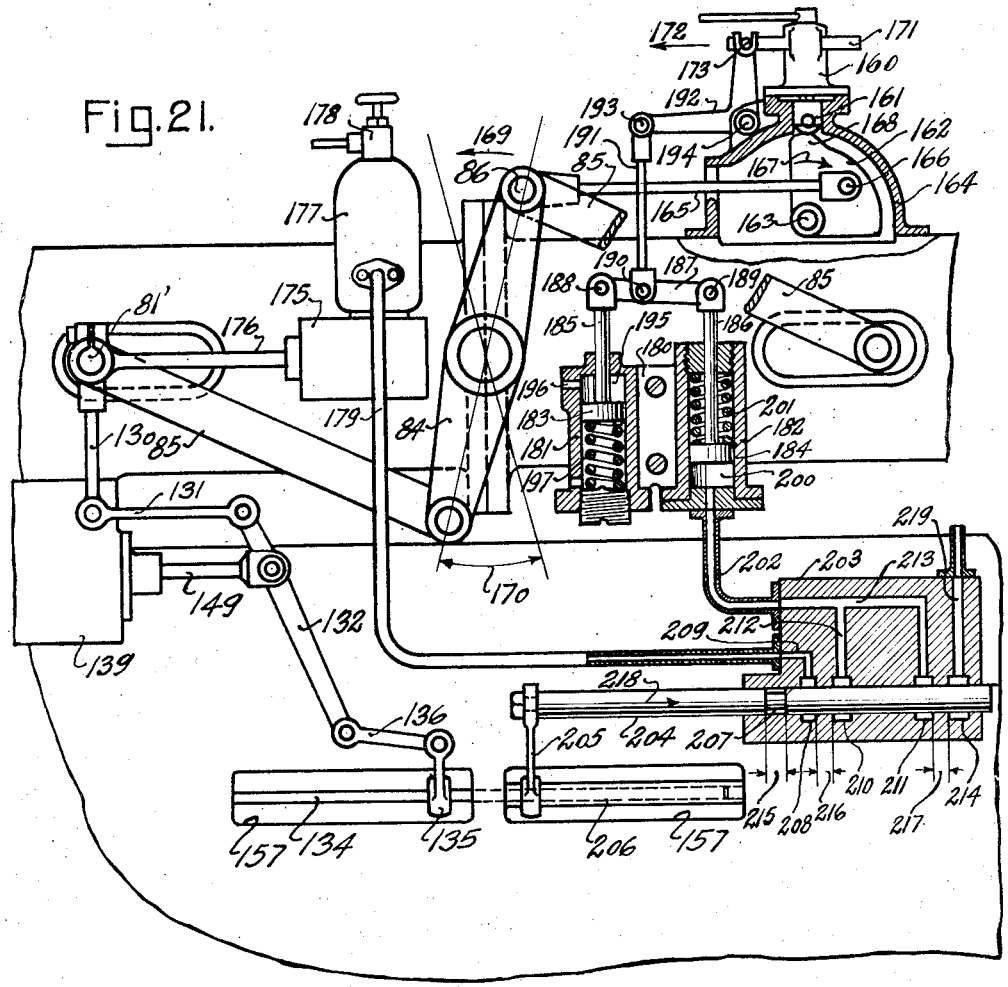
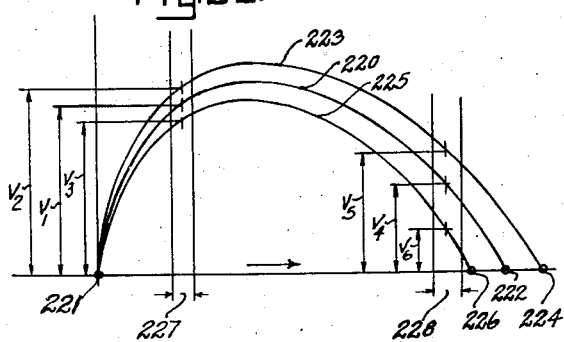
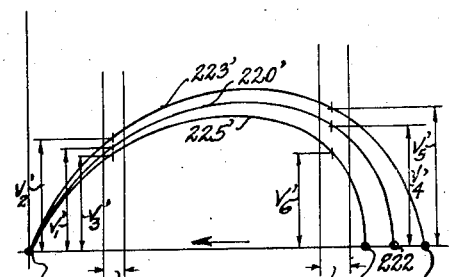

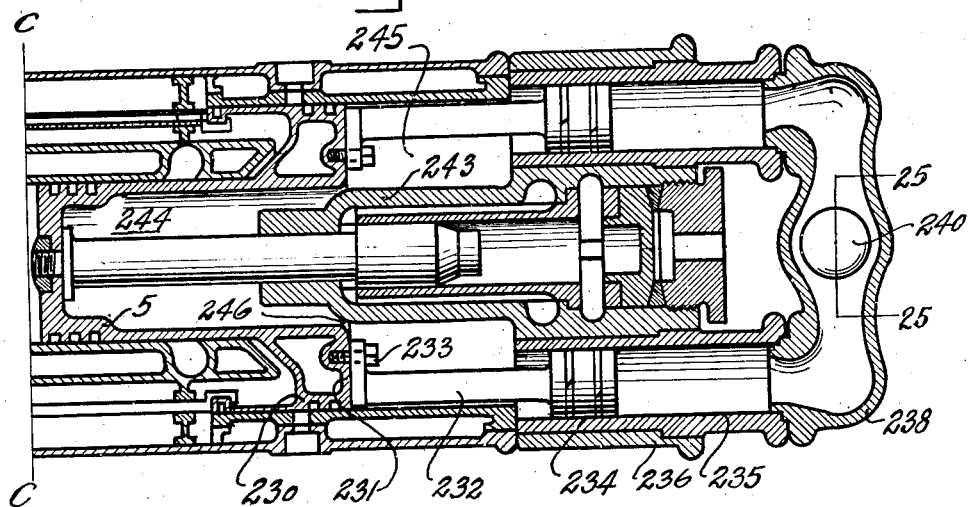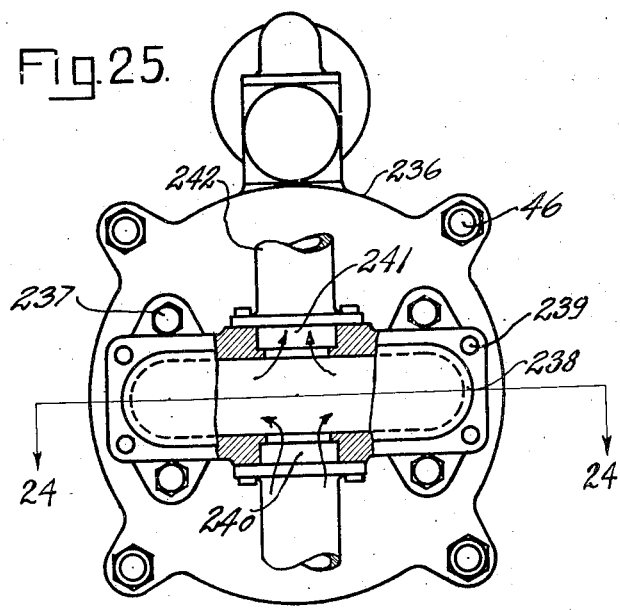

June 15, 1937. G. V. ANDERSON ET AL 2,083,680
INTERNAL COMBUSTION ENGINE
Filed Nov. 11, 1933 9 Sheets-Sheet 8
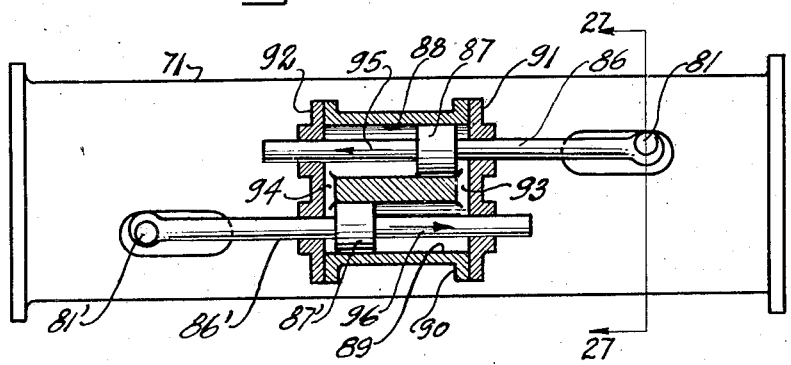
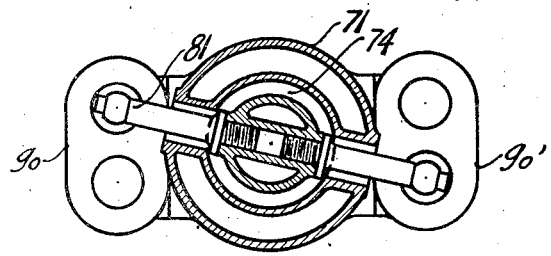
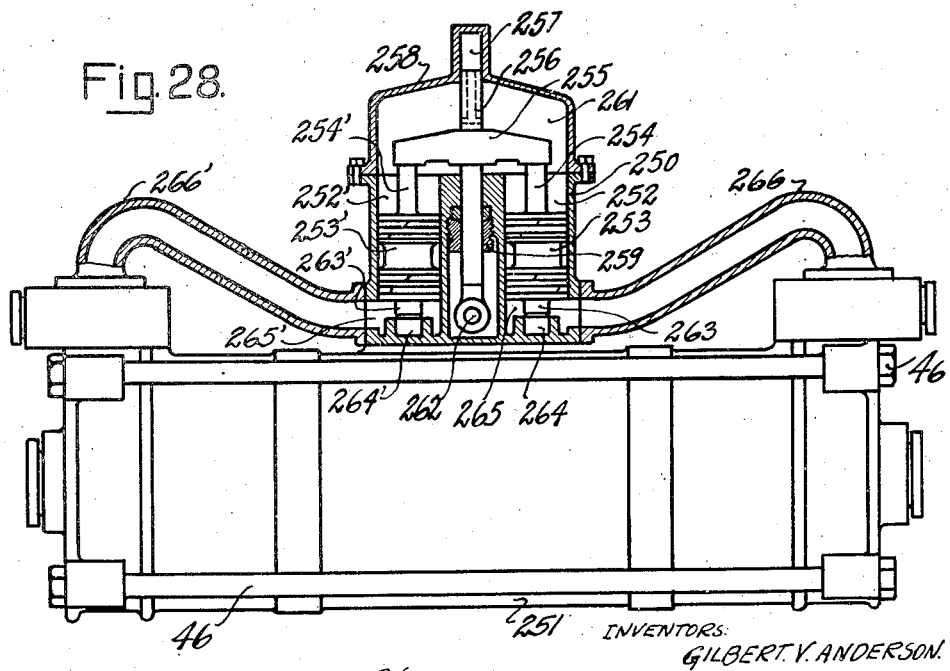
INVENTORS:
GILBERT V. ANDERSON.
ALBERT T. BREMSER.

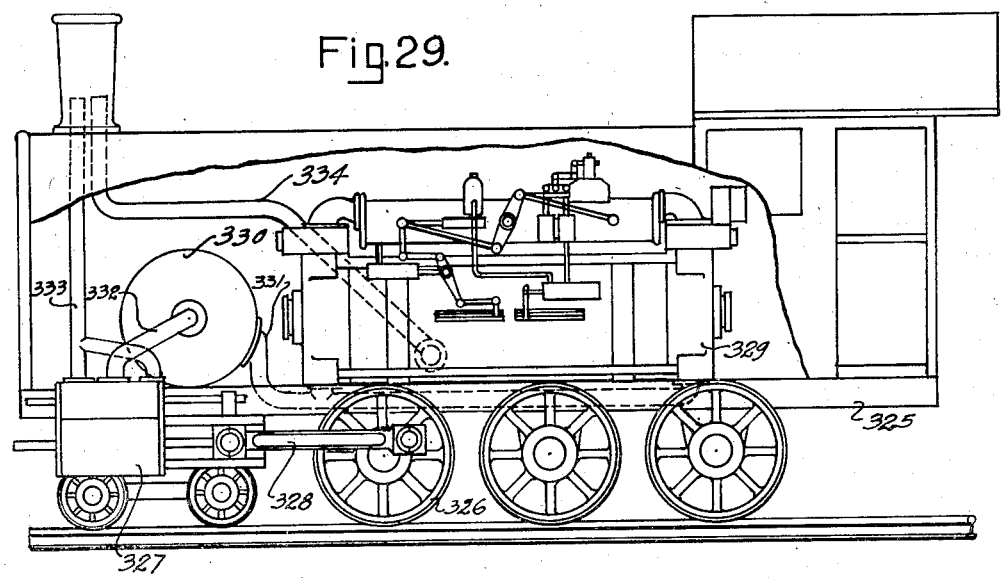
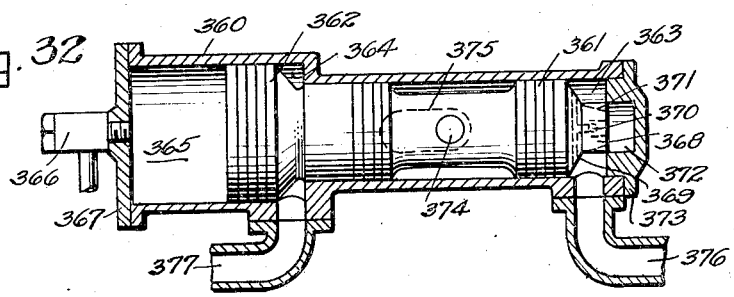
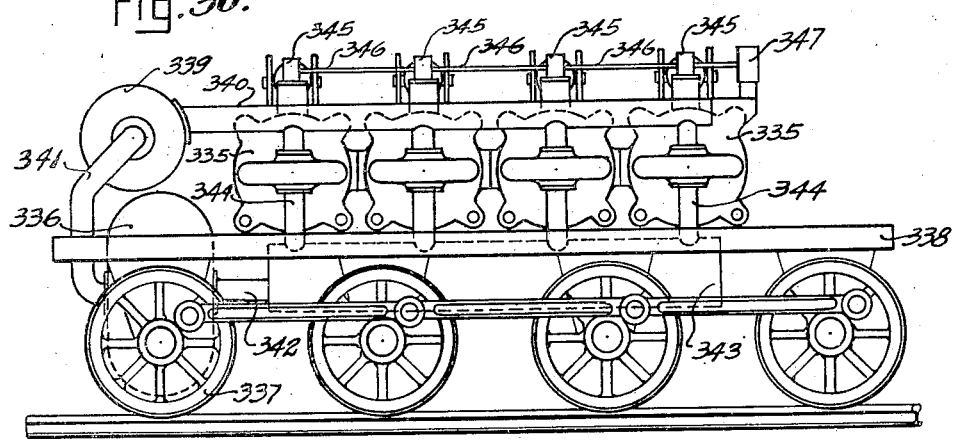

Patented June 15, 1937

2,083,680

UNITED STATES PATENT OFFICE 2,083,680

INTERNAL COMBUSTION ENGINE

Gilbert V. Anderson, Philadelphia, Pa., and Albert T. Bremser, Westmont, N. J., assignors to Larner Machine Company, Philadelphia, Pa., a corporation of Delaware Application November 11, 1933, Serial No. 697,560

19 Claims. (Cl. 123—46)

The present invention relates to internal combustion engines of the free piston type. By engines of the free piston type is meant engines in which the reciprocating motion of the pistons is not transmitted to a crankshaft or other similar device by mechanical means whereby a definite and exact length of piston stroke is established. In a free piston engine the length of piston stroke is maintained at a constant magnitude by providing a perfect balance between the power developed in the engine and the power consumed in the machine which is being driven by the engine.

More particularly, this invention relates to internal combustion engines of the free piston type operating on the Diesel or other thermodynamic cycle in combination with mechanism adapting them to use for pumping purposes or other power utilizing devices of the reciprocating type.

Engines of this type built in combination with power utilizing devices of the type mentioned have so far not been suitable for operation under wide variations of speed and load.

A purpose of this invention is to provide an unusually compact and efficient combination of a power producing unit, in the form of an internal combustion engine, and a power consuming unit in the form of a reciprocating machine such as a piston type air compressor or pump.

A further purpose is to provide a combination of an engine and machine of the aforementioned types in which the power produced is transmitted to the machine without the use of crankshafts, clutches, links or similar devices, in a simple and direct manner.

Another purpose of this invention is to provide a combination of an engine and machine of the reciprocating type and to interpose rest periods between complete working cycles and in so doing to vary the number of cycles or strokes per minute. In case there is no load demand for the engine, ordinary engines of the free piston type as well as those of conventional crankshaft type have to idle and in idling consume a considerable amount of fuel. The provision of rest periods in the engine forming the subject matter of the present invention eliminates the necessity for idling in operation and therefore results in an unusually high fuel economy.

A further object of the invention is to absorb a predetermined amount of power, developed within the engine cylinder, in a body of confined air by compressing this air in an accumulator during the power stroke of the engine piston and to expand this compressed air to effect the compression stroke of the engine piston.

A further purpose is to transmit the energy necessary for the compression stroke of the engine piston and the suction stroke of the compressor or pump by interposing a body of liquid between the engine piston and the accumulator piston and to reciprocate this body of liquid in unison with the engine piston and accumulator piston instead of using mechanical connections between these pistons such as rods, levers, links, gears and similar devices.

A still further object is to interpose a body of liquid between the engine and accumulator pistons as aforesaid to provide a medium necessary and adaptable to accomplish the provision of rest periods between working cycles.

An additional purpose is to provide a novel combination of a two cycle opposed piston engine, a machine for absorbing the engine output and an accumulator with two pistons which are caused to reciprocate in synchronism with one another together with the provision of a hydraulic connection between each accumulator piston and its corresponding engine piston so that the engine pistons reciprocate in synchronism with one another by reason of the synchronized movement of the accumulator pistons.

A further object is to provide between the engine pistons and accumulator pistons a body of liquid of a predetermined quantity or volume and to provide means for maintaining this volume constant and in the case of an opposed piston engine, where two separate bodies of liquid are employed, to maintain the volume of each body of liquid constant and both volumes equal.

Another object of this invention is to provide a novel method whereby the position of the engine piston at the end of the power stroke of this piston is maintained within close limits and the provision of means adapted to practice this method.

A still further object is the provision of novel means in connection with the means for maintaining the local position of the engine piston at the end of the power stroke, for regulating the amount of fuel injected into the engine cylinder for each power stroke to correspond with the load demand of the pump or compressor.

A still further purpose is the provision of novel means for accomplishing the rest periods aforementioned and for regulating the duration thereof.

An additional object is the provision of pressure responsive means in connection with the means for regulating the duration of the rest periods to make this last mentioned regulation automatic.

A still further purpose is to provide novel means for controlling the speed of a multicylinder unit in such a manner that a uniform firing sequence is obtained.

Referring to the accompanying drawings, which are made part hereof:

Fig. 2 is an end view of the unit shown in Fig. 1.

Fig. 3 is a cross-section taken on line 3—3 of Fig. 1.

Fig. 4 shows an enlarged cross-sectional view of parts of Fig. 1.

Fig. 5 shows a cross-section through the apparatus used to accomplish the rest periods and through the engine speed control apparatus.

Fig. 6 is a partial view of Fig. 5 illustrating the rotary valve in open position.

Fig. 7 shows a variation of construction of the engine speed control apparatus similar to that shown in Fig. 5.

Fig. 8 shows details of Fig. 7 giving a cross-sectional view of certain parts along line 8—8 of Fig. 7.

Fig. 9 is an end view 9—9 of Fig. 7.

Figs. 10a, 10b, 10c and 10d illustrate diagrammatically the functioning of the apparatus shown in Figs. 7, 8 and 9.

Fig. 11 shows a cross-section through a rotary speed-control valve for a multicylinder unit.

Fig. 12 shows a diagrammatic illustration of the rest period effected by the rotary speed-control valve.

Fig. 13 shows a diagrammatic illustration of the rest period obtained with a needle type speed control valve.

Fig. 14 shows a cross-section through a needle type engine speed control valve.

Fig. 15 shows a typical indicator diagram of the engine.

Fig. 16 shows a typical indicator diagram of the compressor.

Fig. 17 shows a typical indicator diagram of the accumulator.

Fig. 18 shows a partial cross-sectional view of the engine compressor shown in Fig. 1 together with the apparatus to control the volume of fluid in the hydraulic system.

Fig. 19 shows a partial cross-section through the center portion of the unit shown in Fig. 1 but taken along line 19—19 of Fig. 2 and discloses means for driving auxiliary apparatus shown in Figs. 18 and 21.

Fig. 20 shows a partial cross-sectional view of the accumulator shown in Fig. 18 along line 20—20.

Fig. 21 illustrates diagrammatically the fuel pump, the governing device, and the liquid make-up pump and shows a side elevation of the volume control apparatus shown in Fig. 18.

Figs. 22 and 23 are diagrammatic illustrations of typical velocity curves for the engine pistons and connected parts.

Fig. 24 shows a longitudinal cross-sectional view of one-half portion of an engine pumping unit of similar construction as the engine compressor unit shown in Fig. 1. The cross-section is taken along line 24—24 of Fig. 25.

Fig. 25 shows an end elevation of the unit shown in Fig. 24 and discloses some details in cross-section.

Fig. 26 illustrates diagrammatically an accumulator and hydraulic synchronizing apparatus, showing a longitudinal section through this apparatus.

Fig. 27 is a section taken on line 27—27 of Fig. 26 and also an end elevation of the apparatus shown in Fig. 26.

Fig. 28 shows a side elevation of an engine compressor unit such as shown in Fig. 1 but with an engine accumulator of different construction, disclosing the details of this accumulator in cross-section.

Fig. 29 illustrates diagrammatically in side elevation an application of a free piston type engine-compressor unit to a vehicle for traction purposes.

Fig. 30 shows a similar application of a plurality of engine pumping units to a motor vehicle.

Fig. 31 illustrates automatic means to operate the type of speed control valve shown in Fig. 14.

Fig. 32 shows an engine accumulator with a differential piston.

Fig. 33 shows an engine accumulator with pistons arranged in tandem.

Figure 1:
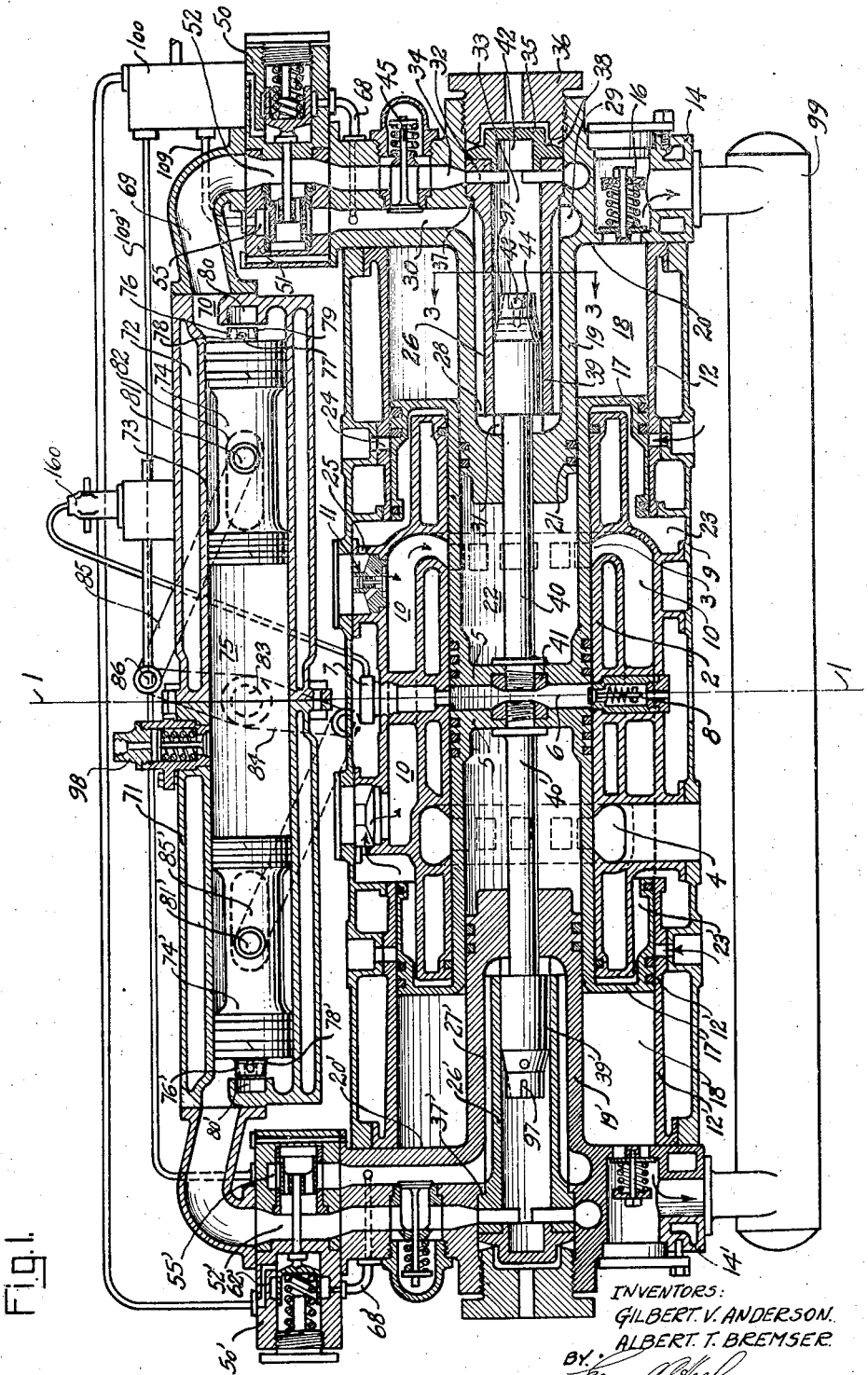
Fig. 1 illustrates a longitudinal sectional view through the center line of an opposed piston engine compressor unit.

Fig. 1 illustrates a Diesel engine-compressor unit of the type referred to. This unit is of the opposed piston type and is, with the exception of engine cylinder 2, constructed symmetrically about the centerplane 1—1. In other words, centerplane 1—1 divides the engine-compressor unit into two halves of substantially identical construction. Plain numerals designate the parts forming one-half of the unit, while the corresponding parts forming the other half have the same numerals with the index '.

*Engine compressor unit.*—The engine consists essentially of the cylinder 2, of known construction used with opposed piston two-cycle engines and the pistons 5 and 5', mounted therein and moving in opposite directions. Scavenging air ports 3 are located at one end of cylinder 2 and exhaust ports 4 are located at the opposite end. The engine pistons 5 and 5' are shown in their inner position forming between them the cylinder space 6, commonly called the combustion space. One or more spray nozzles 7, of known construction, are mounted in the side of cylinder 2 in such a manner as to direct a spray of fuel into the combustion space 6. A starting air valve 8, of known construction, permits the initial setting of the engine pistons with compressed air in well known manner. The method of starting the engine is fully hereinafter described. The engine cylinder 2 is held rigidly in the middle of the cylindrical engine casing 9. Scavenging and charging air is supplied to the engine cylinder from the scavenging air chambers 10 and chambers 10 receive the air through one or more non-return valves diagrammatically indicated at 11 and of known construction.

The compressors consist essentially of the cylinder sleeves 12 and 12' mounted in each end of the engine casing 9, the cylinder heads 14 and 14' containing the suction valves 15 and discharge valves 16, the latter only shown in Fig. 1 but both indicated in Fig. 2, all of known construction, and the compressor pistons 17 and 17' mounted slidably in cylinder sleeves 12 and 12' respectively. The compressor piston 17 and the engine piston 5 are preferably made in one piece and for descriptive purposes numeral 17 refers to that portion of the combined engine and compressor piston which slides in the sleeve 12 and closes off the inner end of the compressor cylinder space 18, while numeral 5 indicates the portion which slides in the engine cylinder 2. The compressor cylinder space 18 is formed in a novel manner by the parts 12, 17 and 14, the cylinder head 14 having a ram 19 formed as a cylindrical extension thereof, extending beyond the flat inner face 20 of the cylinder head 14. The ram 19 carries seal rings 21. The inner bore of piston 5 is machined to fit slidably over ram 19 and rings 21 thus sealing the cylinder space 18 against communication with space 22 on the inside of piston 5. The inner side of piston 17 forms, together with the engine cylinder casting 2 and the engine casing 9, the compression space 23 for the scavenging air. Admission of the scavenging air into space 23 is afforded through passages 24 which are radially arranged around the cylinder sleeve 12 and the casing 9. Space 22 may, if desired, be vented to the atmosphere.

In Fig. 1 the piston 17 is shown in its retracted position, and the scavenging air already has been compressed in space 23 and transferred through passages 25 and the valve 11 into the chambers 10. The arrows indicate the direction of flow of the scavenging air.

A cylindrical sleeve 26 is inserted axially into the cylinder head 14 and the ram 19. Longitudinal grooves 28 are arranged around the outer circumference of sleeve 26. This construction is shown in detail in Fig. 3. The grooves 28 communicate with a common, preferably a circular, cavity 29 in the cylinder head 14 and this cavity 29 communicates with passage 30. The inner end of grooves 28 communicate with the inner cylinder space 31. Near the outer end of sleeve 26 are port openings 32 which effect communication between the cylinder 33 and the passages 34.

Sleeve 26 is closed off at its outer end by the cap 35 and both are held securely in the cylinder head 14 by the nut 36. Ground faces, or a gasket, afford perfect seal between passages 30 and 34 at the shoulder 37 of sleeve 26 while a tapered gasket 38 prevents leakage along the outer diameter of cap 35.

A differential piston 39 is mounted slidably in the sleeve 26 and is securely attached to the piston 5 by the piston rod 40 and the nut 41. The free end of piston 39 is smaller in size than the remainder of the piston and will enter slidably into the pocket 42 of cap 35. A check valve 43, passages 44 and grooves 97, are provided on the free end of piston 39 and are illustrated in a larger scale in Fig. 4.

A non-return valve 45 permits oneway communication between passages 30 and 34 in the cylinder head 14.

The two cylinder heads 14 and 14' are held securely against the engine casing 9 by the tie rods 46, which are shown in Figs. 2 and 28 but not shown in Fig. 1.

*Engine stroke release valve.*—The piston valve assemblies 50 and 50' are mounted rigidly on the outer sides of the cylinder head 14 and 14'. To afford a better understanding of the piston valve assemblies 50 and 50' a cross-sectional longitudinal view identical with that shown in Fig. 1 is illustrated as a part of Fig. 5. Figs. 1 and 5 will best be considered simultaneously in explaining the piston valves. The valve casing 51 has a passage 52 connecting with passage 34 in the cylinder head 14 and a cylindrical sleeve 53, which has ports 54 arranged radially and which communicate with the annular cavity 55, also formed in the valve casing 51. Cavity 55 is directly connected to passage 30. A piston valve 56 slides in sleeve 53 and is long enough to cover the ports 54 with a sufficient overlap of the edges to give a proper seal.

The open end of the valve casing 51 is closed off by the valve casing 57 which is bored out cylindrically. The piston 58 is mounted slidably in the casing 57 and connects with piston valve 56 by means of piston rod 59 which protrudes through the casing 57 and is fitted slidably therein. The stop-collar 60 limits the stroke of piston 58 towards the left and when held against the stop-collar 60 by the spring 61, the piston valve 56 fully overlaps the ports 54. Passage 62 forms the connection between the cylinder space 63 and the engine speed control valve 100 shown in detail in Fig. 5, which will be explained later on in the specifications. The valve casing 57 is closed off on one end by the plug 64, which also serves as a stroke-limiting stop for piston 58, thus forming the cylinder space 65. Communication between 65 and passage 34 is established by the tubular connection 66. An annular groove 67 in the cylinder bore of casing 57 is overlapped by piston 58 when said piston is in the position shown and the amount of overlap of the edges is the same as the amount of overlap of the ports 54 by the piston valve 55. The annular groove 67 connects with passage 30 by means of the passage 68.

Now referring to Fig. 1 only it will be noted that the passage 52 is continued by means of passage 69 to the fluid cylinder space 70 of the engine accumulator 71. By the term "engine accumulator" is meant means for containing pressure fluid to effect the compression strokes of the engine pistons. The accumulator 71 is cylindrical and has a waterjacket 72 surrounding a cylindrical bore 73 into which are slidably inserted the double acting accumulator pistons 74 and 74'. The space 75 between the pistons 74 and 74' is filled with air, preferably air under pressure which is initially admitted through the spring loaded valve 98. The end of the piston 74 facing the fluid cylinder space 70 has an extension 76 with a check valve 77 and passages 78 and grooves 79, and its diameter is of such dimension as to permit the extension 76 to enter the cylindrical cavity 80 slidably. The design of extension 76 and the cavity 80 is identical with that shown in Fig. 4 which serves to control the over-stroke of the engine pistons. Piston pin 81 is inserted into the piston 74 and protrudes outside the accumulator 71. Elongated openings 82 through the waterjacket 72 permit unobstructed reciprocating movement of the piston pins 81 and 81'. Fulcrum pins 83 are positioned in the middle between the two pistons 74 and 74' on the side of the accumulator 71 and serve as fulcrums for the rocker levers 84. The two arms of the rocker levers 84 are of equal length and their ends are connected to the piston pins 81 and 81' by rods 85 of equal length and pins 86.

Now, having fully described the major parts forming the engine-compressor unit, the functions of these parts will be explained while the engine is in operation.

To give a better understanding of the operation of a free piston engine-compressor, a diagrammatic illustration of the working cycles of the free piston engine, compressor and accumulator forming the subject matter of this invention are shown in Figs. 15, 16 and 17. The diagrams shown are pressure-displacement diagrams.

In Fig. 15, compression in the engine takes place according to curve B—C and the area ABC represents the energy necessary to effect the compression. Line C—D indicates the pressure rise during combustion, and expansion takes place according to curve D—E, while from E to B the combustion gases are being expelled from the engine cylinder.

In Fig. 16 compression in the air compressor takes place according to curve G—H and delivery of the compressed air into the receiver follows line H—I. The compressed air contained in the clearance space of the air compressor cylinder expands as indicated by curve I—K, while a new charge of air is drawn into the compressor cylinder as indicated by line K—G.

In Fig. 17, which shows the pressure-displacement diagram of the accumulator, M indicates the initial air pressure in the accumulator cylinder and curve M—N is the compression and expansion line, so that N indicates the maximum compression pressure. A second compression and expansion curve M' N' is shown as a straight line, indicating that the air pressure remains constant or very near constant. This condition is obtained when the volume 75 of the accumulator shown in Fig. 1 is made very large. In that case valve 98 is omitted and replaced by a pipe connection of liberal size to the large compressed air tank. It is, however, necessary that the areas L—M—N—O and L—M'—N'—O are equal so that the same amount of energy is stored in and subsequently delivered by the compressed air.

Dynamic balance in the engine-compressor unit exists when area BCDE, which represents the useful energy developed within the engine cylinder, equals area CHIK which indicates the energy consumed by the air compressor, and when area ABC equals area LMNO plus area IKF.

*Operation of engine-compressor unit and its stroke release.*—In Fig. 1, the engine pistons 5 and 5' and compressor pistons 17 and 17' are in their innermost positions, while the accumulator pistons 74 and 74' are in their outer positions. The hydraulic pistons 39 and 39' are also in their innermost positions. The combustion space 6 is filled with highly compressed and highly heated air and fuel is being injected into this space by the nozzle 7, fuel being supplied to this nozzle by fuel pump 160. The chambers 31, 33 and 70, together with intercommunicating passages are substantially completely filled with a fluid, as, for example, oil, whereas the cylinder space 75 of the accumulator 71 contains air under pressure. The compressor cylinder 18 contains air which is to be compressed and to be pumped to an air receiver 99.

Combustion takes place in 6, the combustion pressure forcing the pistons 5 and 5' apart. Compressor pistons 17 and 17' move toward the cylinder heads 14 and 14' respectively. The air suction valves 15, shown in Fig. 2, are closed and the air in 18 is being compressed until the outlet valves 16 open, so that, as 17 proceeds on its outward stroke, air under a predetermined pressure is forced through valves 16 into the receiver 99. The discharge of the compressed air continues until pistons 17 and 17' have come within close proximity of the face 20, coming to a stop without touching it. Since the hydraulic piston 39 is mechanically connected to piston 5, it also will travel outwardly and in so doing will displace fluid and force a portion thereof into cylinder space 70, as hereinafter explained, thus moving the accumulator pistons 74 and 74' towards each other. The air in 75 will be compressed to a higher pressure. The flow of liquid into 70 and also the movement of pistons 74 and 74' will cease as soon as pistons 5—17—39 and 5'—17'—39' have come to a standstill as explained. It will be noted that while piston 39 displaces liquid from cylinder space 33 into passage 34, a fixed amount of liquid will be drawn into 31. In other words, part of the fluid displaced by 39 in its outward stroke will flow through non-return valve 45 into passage 30 and subsequently through 29 and 28 into 31. It is for that reason that only a portion of the fluid displaced by piston 39 flows into 70. As soon as the outward movement of piston 39 is terminated valve 45 will close again.

Shortly before reaching its outer position the piston 5' will uncover the exhaust ports 4. Gas pressure in the engine cylinder will be released through these ports into the atmosphere and shortly thereafter, but before the pistons have terminated their outward movement, the piston 5 will uncover the scavenging ports 3 and air under a light pressure will flow from 10 into the engine cylinder.

All pistons are at a standstill as soon as the engine piston has terminated its outward stroke. A high air pressure is being exerted upon pistons 74 and 74' by the compressed air in chamber 75. This pressure is being transmitted to the fluid in the hydraulic system of the engine and subsequently the fluid imposes a high pressure upon the piston 39, on the end thereof facing chamber 33. Therefore all pistons have a tendency to move again, this time in the opposite direction, i. e., the accumulator pistons 74 and 74' outwardly and the pistons 39, 5 and 17 inwardly.

Movement of the pistons, in the direction just explained, is prevented since piston valve 56 closes off the ports 54 and since non-return valve 45 is closed. Therefore the fluid intermediate between valve 56 and chamber 31 cannot escape into passage 34, from whence it came during the outward stroke of 39. The entire fluid pressure exerted upon the outer and larger face of 39 is counteracted by fluid pressure acting upon the shoulder at the other end of 39 and the piston is locked in position.

In order to permit expansion of the air in 75 and subsequent return movement of the pistons, the piston valve 56 has to be moved axially to uncover the ports 54 and permit fluid to escape from chamber 31. Axial movement of the piston valve 56 is accomplished by making use of the difference between the pressure of the fluid in passage 34 and the pressure of the fluid in passage 30, the latter being under a higher pressure than that contained in passage 34. Axial movement of the piston valve 56 is effected by connecting passage 30 with passage 62 and chamber 63. Fluid under high pressure from 30 will exert a high pressure upon piston 58, thus moving this piston to the right and compressing the return spring 61. Transfer of fluid from 30 to 63 is accomplished by the engine speed control valve 100. This valve is connected to passages 30 and 62 and will be described in detail later on in the specification.

As stated above, piston 58 moves toward the right until it uncovers the annular groove 67. At the same time piston valve 56 will move toward the right and uncover ports 54. The fluid may then flow freely past valve 56 into 34. As soon as chamber 63 is connected with groove 67 the piston 58 and the piston valve 56 will remain open until the flow from chamber 70 in accumulator 71 stops. Chamber 65 of the valve casing 57 is connected with passage 34 by means of the connection 66 so that no liquid can be trapped in chamber 65.

While piston 17 is travelling towards its inner position it will first cover the passages 24 in the cylinder sleeve 12 and will then compress the air contained in chamber 23 and transfer this air through the passages 25 and the non-return valve 11 into the scavenging air chambers 16. At the same time piston 17 will draw a fresh charge of air into cylinder 18 through the suction valves 15.

While piston 5 is moving to its inner position it will at first close off the scavenging air ports 3, and piston 5' will close off the exhaust ports 4. While continuing their movements towards each other, the air charge contained in cylinder 2 between the pistons 5 and 5' will be compressed until the pistons come to a standstill in the position shown in Fig. 1. Fuel will then be injected again and the cycle as described will be repeated.

*Synchronizing means.*—It is evident that it is necessary to synchronize the movement of the pistons 5, 17, 39 and 74 with the pistons 5', 17', 39' and 74'. Fig. 1 shows a means of mechanical synchronization of the pistons 74 and 74' by means of the rocking lever 84 and the connecting rods 85. Since the liquid connecting the pistons 74 and 74' with the pistons 39 and 39' respectively, is under pressure at all times during the engine cycle, it is evident that the liquid takes the place of a mechanical connection between the accumulator piston 74 and 74' and the pistons 39 and 39'. In other words, since the movements of the accumulator pistons are synchronized and since the engine pistons and accumulator pistons move in unison, therefore the movement of the engine pistons are synchronized.

Another means of synchronization is shown in Figs. 26 and 27.

In Figs. 26 and 27, the accumulator 71 is the same as shown in Fig. 1.

Attached to the piston pins 81 and 81' are the piston rods 86, each one of which carries a hydraulic plunger 87 and 87'. The plungers 87 and 87', of equal diameter, reciprocate in opposite directions in the cylinder bores 88 and 89, respectively. The casings 90 and 90' are closed off by the covers 91 and 92 through which the piston rods 86 and 86' protrude. Cylinder bores 88 and 89 communicate with each other at each end by means of the passages 93 and 94. The cylinders 88 and 89, and also the passages 93 and 94, are filled with fluid.

It is evident that when plunger 87 moves in the direction of arrow 95, plunger 87' is forced to move in the direction indicated by arrow 96, since fluid is displaced from 88 through channel 94 to the left face of plunger 87' and also from 89 through channel 93 to the right face of plunger 87. Since the volume displacement of both plungers 87 and 87' are equal the plungers are forced to move together, in opposite directions and at the same velocity, thus resulting in a perfectly synchronized movement of the accumulator pistons 74 and 74'.

Whereas the form of accumulator 71 illustrated in Figs. 1, 2 and 25 and partly shown in Figs. 18, 20, 21 and 26, represents a preferred form of construction, other forms of accumulators may be employed.

*Modified accumulator.*—Fig. 28 illustrates an accumulator 250 in connection with an engine-compressor unit 251 of the same general construction as illustrated in Fig. 1. In this form of accumulator, two cylinders 252 and 252' are arranged side by side and parallel to each other and the pistons 253 and 253', of identical construction and dimensions, are mounted slidably therein. The pistons are rigidly connected with each other by means of rods 254 and 254' and the yoke 255. Centrally inserted through the yoke and parallel to the cylinders 252 and 252', is a guide rod 256, one end of which fits slidably into the cylindrical extension of the common cylinder head 258 whereas the other end fits slidably through and extends outside the center portion of the accumulator casing 250. Stuffing box 259 prevents leakage from chamber 261. The free end 262 of the guide rod 256 may be used to drive auxiliary apparatus employed to operate the engine.

The extensions 263 and 263', and also the dash-pots 264 and 264', may be of the same design as illustrated in Fig. 4 and are intended to serve the same purpose.

Fluid is pumped into chambers 265 and 265' from the engine through pipe connections 266 and 266' during the expansion stroke of the engine. Pistons 253 and 253' will move upwards, thus compressing the air contained in the chamber 261. The yoke 255 and the guide rod 256 assure synchronized movement of the pistons 253 and 253'. Expansion of the compressed air in chamber 261 will effect transfer of fluid from chambers 265 and 265' into the engine, thus providing the energy and movement necessary to effect a synchronized compression stroke of the engine pistons.

Synchronization of the engine pistons may be effected without the use of any linkage by the accumulator illustrated in Fig. 32. The cylinder 360 contains a reciprocating differential piston consisting of two elements 361 and 362 of different diameters. The area of 361 exposed to the fluid in chamber 363 is the same as the area of 362 exposed to the fluid in chamber 364. Chamber 365 is filled with air under a predetermined pressure admitted to this chamber through valve 366, mounted in cover 367 and which is identical with valve 98, Fig. 1. The free end of 361 has an extension 368 containing passages 369, a non-return valve 370 and grooves 371, and fits slidably into the pocket 372 in cover 373. This construction is identical with that shown in Fig. 4 and serves the same purpose. A pin 374 is inserted through 361 and extends outside the cylinder 360 through openings 375. It serves to drive auxiliary apparatus used to operate the engine pumping unit as, for example, the arm 130 of Figs. 18 and 21. Conduits 376 and 377 serve the same purpose as conduits 366 and 366' of Fig. 28 and are to be connected to the engine in the same manner. Since the fluid displacements of 361 and 362 are equal it is evident that synchronized movement of the engine pistons is effected. During the expansion stroke of the engine the air in chamber 365 is compressed to a higher pressure and then expands to effect the compression stroke of the engine pistons.

The accumulator illustrated in Fig. 33 will also effect synchronized movement of the engine pistons. The accumulator casing 380 consists essentially of two cylinders 381 and 382 which open at one end into the chamber 383. Pistons 384 and 385 rigidly mounted on a common piston rod 386, reciprocate in the cylinders and divide them into chambers 387, 388, 389 and 390. Chambers 387, 389 and 383 contain air under pressure admitted by non-return valve 391, which is identical with valve 98 of Fig. 1. Chambers 388 and 390 contain fluid under pressure which is a portion of the fluid contained in the hydraulic systems of the engine and conduits 392 and 392' connect with the engine in the same manner as conduits 266 and 266', Fig. 28. Covers 393 and 394 close the accumulator casing 380 and the piston rod 386 protrudes through cover 393. One end 395 of 386 may be adapted to drive auxiliary apparatus used to operate the engine and corresponds functionally to pin 374 of Fig. 32. Since both pistons 384 and 385 are of equal diameter, the same amount of fluid is displaced by them and synchronized movement of the engine pistons is effected.

*Engine speed control valve.*—Considering how the matter of speed control. Fig. 5 shows how communication is effected between passages 30 and 34 by means of piston valve 56.

The engine speed control valve may be of the rotary type as shown in Fig. 5. It consists of a valve body 100 having passages 101 and 102 formed therein and also carrying the rotary valve 103. Grooves 104 and 105 are provided in the surface of the rotary valve 103 diametrically opposite each other. Their purpose is to effect communication between passages 101 and 102 and 101' and 102', respectively. Further communication between passages 101 and 102 and 101' and 102' is afforded by passages 106 and 106', respectively, when the valves 107 and 107', which are being closed by springs 108 and 108', are in open position. Passage 101' is to be connected to passage 55' in Fig. 1 and passage 102' to passage 62' in Fig. 1, whereas passage 101 communicates with 55 by means of tubular connection 109, and passage 102 leads directly to passage 62 shown in Fig. 5.

Fig. 6 shows the position of the rotary valve 103 when effecting communication between 101 and 102 and 101' and 102', respectively. The arrows indicate the direction of flow. It should also be noted that communication between 101 and 102 and 101' and 102' takes place simultaneously so that both portions of the engine-compressor unit operate in synchronism. It has been explained previously that the fluid under pressure transferred from chamber 55 to chamber 63 causes axial movement of the piston 58 and valve 56. It is evident that after the rotary valve 103 has established communication between 101 and 102 it will, while continuing its rotation, terminate this communication. At that time the piston 58 has moved axially against stop 64. When piston 58 returns to the position shown in Figs. 1 and 5, it will at first displace fluid from chamber 63 to passage 30 through annular groove 67 and tubular connection 68, until the groove 67 is substantially overlapped by the piston and while continuing its movement until the stop collar 60 terminates the movement of the piston 58, the latter will displace fluid from 63 to 55 through the one way valve 107.

The rotary valve 103 is rotated by some form of motor, such as electric, hydraulic, pneumatic or other form. Fig. 5 shows a hydraulic motor 110. The speed of rotation of this motor is controlled by regulating the rate of flow of fluid through the motor. The inlet pipe 111 is connected to the needle valve body 112. The needle valve 113 is mounted slidably in 112 so as to regulate the opening 114. Fluid is admitted to 115 by means of passage 116, the tubular connection 117 and the shut-off valve 118 from an accumulator 177, Fig. 21, referred to later. Axial movement of the needle valve is obtained by movement of the piston 119 which connects to the needle valve by means of rod 120. Piston 119 is mounted slidably in cylinder 121 and divides this cylinder into two chambers 122 and 123. Chamber 122 is vented to the atmosphere and chamber 123 is connected to the air receiver 99 shown in Fig. 1, so that the pressure in 123 is always equal to the pressure in the air receiver 99. The air pressure upon piston 119 is counter-balanced by spring 124. It is evident that a reduction of pressure in chamber 123 will result in an axial movement of piston 119 in the direction of arrow 125, and also in a movement of the needle valve in the same direction, which will result in an increased rate of flow of fluid to the hydraulic motor 110, effecting an increase in speed of this motor, and a subsequent increase in strokes per minute of the engine-compressor. Valve 118 serves to stop the hydraulic motor 110 which in turn stops the engine irrespective of the position of the needle valve 113.

An important consideration in connection with the regulation of the number of strokes per minute by means of the rotary speed control valve is the minimum rotative speed at which the rotary valve will effect a rest period after each engine cycle. The slower this speed can be made, the greater will be the ratio between maximum and minimum number of engine cycles per minute.

It is generally known that the time required to perform a complete engine cycle in a free piston engine is a function of the mass of the reciprocating parts and that this time does not vary much with a wide variation of engine loads.

It is evident that when the speed of rotation of the rotary speed control valve is being reduced progressively, the length of the time interval during which passages 101 and 102 communicate, will increase at the same rate as the speed of rotation decreases. For a certain speed of rotation this time interval will be equal to the time required for one engine cycle. Evidently this is the minimum speed at which the rotary valve will effect a rest period after each engine cycle.

The area of the passages 101 and 102 and the width of the groove 104 have to be comparatively large in order to permit a sufficient amount of fluid to pass into chamber 63 during the short time available when the engine is operating at maximum speed. Therefore wide passages and grooves are required for maximum speed, resulting in a long time interval of communication between 101 and 102 at slow speed, so that the minimum speed which can be attained with the rotary valve in Figs. 5 and 6 is quite high. At slow speeds the groove 104 could be quite narrow since a longer time interval is available for the transfer of fluid into 63 and a narrow groove would result in a shorter time interval for communication of 101 and 102 and therefore in a lesser minimum number of engine cycles per minute. Rotary valve means which provide a slower minimum speed than can be obtained with the design shown in Figs. 5 and 6, without affecting the maximum engine speed, are shown in Figs. 7, 8, 9 and 10.

*Modification of speed control valve.*—The valve casing 275 is of identical construction as the casing 100 shown in Figs. 5 and 6 and for that reason the various passages in 275 are indicated by the same numerals as in Figs. 5 and 6. The rotary valve proper consists of two parts 276 and 277. Part 276 is rotated by the hydraulic motor 110. It has a shaft extension 278, shown in Figs. 7, 8 and 9, and part 277 is fitted rotatably over the extension 278 and both parts 276 and 277 are fitted rotatably into the valve casing 275. Slidably mounted on the free end of the extension 278 is the collar 279. The key 280 is fitted securely into the extension 278 and slidably into collar 279, and the latter can be moved axially on the extension 278 by means of the stirrup 281 mounted on the rocking lever 282. 282 is pivoted at 283 in the bracket 284. Collar 279 has arms 285 provided with pins 286. These pins 286 fit slidably into helical grooves 287 cut into the free end of part 277 which protrudes outside the valve casing 275. Groove 288 is cut into the part 276 and groove 289 in part 277. Both grooves are of identical dimensions and serve to establish communication between passages 101 and 102. For full speed of the engine, these grooves are positioned in line with one another as indicated diagrammatically in Fig. 10a, and when the engine speed is to be reduced the groove 289 is displaced rotatively relative to groove 288. This relative rotation of groove 289 is effected by rotating part 277 by means of axial movement of the collar 279 which is effected by the stirrup 281. The speed of rotation of the hydraulic motor 110 is regulated by the needle valve 113 of the same construction as shown in Fig. 5. The needle valve may be operated automatically, as shown in Fig. 5, or by means of the handwheel 290 and the screw spindle 291. Movement of the needle valve is transmitted to the stirrup lever 282 by means of arm 292, rod 293, bell crank 294 and rod 25. The interconnection just described is such as to bring grooves 288 and 289 in line with one another when the needle valve 113 is in full speed, or wide open, position, and will effect rotative movement of groove 289 relative to groove 288 while the needle-valve is being moved to closed, or minimum speed, position.

Rotation of groove 289 out of line with groove 288 will effect a shorter period of communication between passages 101 and 102, as best shown in Figs. 10a, 10b, 10c, and 10d. In Fig. 10a the position of the passages 101 and 102 with relation to grooves 288 and 289 is shown at the moment of the beginning of communication between passages 101 and 102 when the rotary valve rotates in the direction indicated by the arrow.

Fig. 10b illustrates the duration of communication between 101 and 102 as indicated by angle 296 which is the amount of angular movement of the leading edge 397, or the trailing edge 298, of the grooves 288 and 289 from beginning to end of the communication between passages 101 and 102. Fig. 10c shows the groove 289 rotated relative to groove 288 and indicates the position of the passages 101 and 102 with relation to the grooves 288 and 289 at the time of beginning of the communication between 101 and 102. It will be noted that the moment of beginning communication is determined by the leading edge 297 of groove 288 and the moment of terminating communication is established by the trailing edge 298 of groove 289.

Fig. 10d shows the groove 289 in the position it assumes at the moment of beginning communication and the angle 299 indicates the angular duration of communication.

It will be noted that the angle 299 is substantially smaller than angle 296. In other words, the duration of communication between passages 101 and 102 may be varied considerably.

The rotary speed control valves just described are particularly adapted to regulate the speed of a multicylinder engine-compressor unit or engine-pumping unit and to provide an even firing sequence of the cylinders of such a unit.

Referring to Fig. 11, which is a cross-section taken on line 11 of Fig. 7, normal to the axis of the rotary valve, the valve block 275 is provided with four pairs of passages 102 and 102', 102a and 102a', 102b and 102b', and 102c and 102c'. It is also provided with four pairs of corresponding passages 101 and 101', 101a and 101a', 101b and 101b', and 101c and 101c'. These passages are spaced at 45° angles and each pair is connected to the hydraulic systems of a single cylinder opposed piston engine power unit such as shown in Figs. 1 and 24. While rotating, the valve parts 276 and 277 will successively effect opening of the piston valves 56 of the four engine power units. By this means a single speed control valve can be employed to regulate the speed of a plurality of engine-power units.

*Rest period.*—To afford a better understanding of the term "rest period", the diagram, Fig. 12, shows the amount of movement 300 of the engine piston during various time intervals, reference also being had to Figs. 1 and 5 for illustration. No movement takes place during the period 301 to 302 as during this time groove 104 of the speed control valve 103 is out of communication with passages 101 and 102. From 302 to 303 said groove 104 is in communication with passages 101 and 102, thereby allowing transfer of fluid out of chamber 31 through passage 30, chamber 50 and pipe 109, passage 101, groove 104 and passage 102 into chamber 63, resulting in a slight movement of the engine piston due to the small discharge from chamber 31. This movement is controlled by the rate of flow of fluid out of chamber 31 and associated passages. Fluid flowing into chamber 33 causes piston 58 and its piston valve 56 to be gradually moved until it opens at 303 whereupon fluid discharges freely from chamber 31 and passage 30 through piston 56 to passage 34, thus allowing the engine piston to begin its actual compression stroke ending at 304, but this movement is not controlled by any restricted transfer of fluid. At 301', the engine piston ends its expansion stroke and a rest period occurs ending at 302'.

Now it will be shown that the number of engine cycles per minute can be varied without interposing a period of absolute standstill of the engine piston at the end of the expansion stroke. In Fig. 12 the period 302 to 303, during which fluid is transferred into chamber 63, to open piston valve 56, is relatively short and in Fig. 13, which also illustrates diagrammatically the amount of piston movement 305 of the engine piston during various time intervals, the period of transfer 306 to 307 of fluid into chamber 63, to open piston valve 56, takes the place of the period of absolute standstill 301 to 302 and the period of a slight but controlled piston movement 302 to 303 in Fig. 12. In other words, the number of engine cycles per minute is varied by changing the duration 306 to 307 of the fluid transfer period to effect opening of piston valve 56. The amount of movement of the engine piston during the period 306 to 307 is so small, that the air charge in the engine cylinder is not being compressed as yet, since the exhaust ports and scavenging air ports 3 remain open during this movement. In other words, the compression stroke of the engine pistons has not yet begun, and the engine piston merely moves into position 307 to get ready for the compression stroke. Therefore, since the movement 306 to 307 is immaterial as far as the actual compression stroke of the engine pistons is concerned, it is also termed "rest period."

A means to effect the last named rest period is disclosed in Fig. 14. A valve-block 310 has passages 311 and 312 which lead into chamber 313. A differential springloaded needle valve 314 is mounted slidably in 313 and is held in closed position by spring 315, as long as there is equal fluid pressure in 311 and 312. The lift of the needle valve 314, caused by an increase in fluid pressure in 312 and chamber 313, is limited by the adjustable stop pin 316 and the amount of lift is indicated by 317. The amount of lift 317 is varied by means of screw 318 and handwheel 319, but may also be varied by automatic means, if desired. Port 320, leading from 312 into 311, is closed by non-return valve 321. Tubular connection 109, Fig. 5, is connected to passage 312 and passage 311 leads into 62. Increase in fluid pressure in 312 will open needle valve 314, thus permitting flow of liquid into 311, which will effect opening of valve 56. Variation of the lift 317 of the needle valve will vary the time required to open valve 56 and thus vary the duration of the rest period. Non-return valve 321 serves the same purpose as valve 107, Fig. 5. Each engine-half can have a separate speed control valve and both valves are then adjusted to provide the same amount of lift 317 and simultaneous variation of the lift is effected by transmitting rotation of screw 318 to the same screw of the second valve by customary means, such as gears and rods, or by sprockets 322 and chain 323.

In reference to Fig. 14 it has been stated that the manual control of the lift 317 of the differential needle valve 314 could be replaced by automatic control.

In Fig. 31 the screw spindle 318 has a gear 350 meshed with a tooth rack 351. The latter is attached to the rod 352 of the piston 353. Piston 353 divides the cylinder 354 into two chambers 355 and 356. Spring 357 acts as return spring for piston 353. Chamber 355 is vented to the atmosphere while air is admitted to chamber 356 through port 358 from the air receiver 99 (Fig. 1) or the high pressure liquid receiver 339 (Fig. 30). Increase of pressure in chamber 356 will cause movement of piston 353 in the direction of arrow 359 and tooth rack 351 will rotate gear 350 and screw spindle 318, which latter will move downward and reduce clearance 317. A smaller lift of needle valve 314 will result and this will effect a decrease in engine speed.

*Method of starting and stopping engine.*—To put the engine in operating condition, air at a predetermined pressure, which is the minimum normal working pressure of the accumulator, indicated by L—M in Fig. 17, is admitted to chamber 75 of the accumulator through valve 98. This valve is connected with a source of supply of compressed air, such as an air tank, not shown, and the air pressure in this tank is maintained slightly higher than the minimum normal working pressure in the accumulator, so that if the minimum working pressure in the accumulator drops below normal, for example, due to leakage past the pistons 74 and 74', the leakage will be replenished automatically through the spring-loaded non-return valve 98. When the engine and accumulator pistons are in the position shown in Fig. 1, compressed air is admitted into the combustion space 6 of the engine through valve 8. The engine pistons will move outwardly and the accumulator pistons inwardly thus compressing the air in 75 to a higher pressure. When the engine pistons have reached their outward position, they will be retained in this position since the piston valve 56 of Fig. 5 is closed and since the speed control valve is in closed position. In the rotary speed control valve shown in Fig. 5, the rotary valve 103 can be set in closed position by rotating it with hand wheel 400 until the pointer 401, attached to the valve 103 registers with the fixed pointer 402, which is attached to the valve casing 100. The speed control valve shown in Fig. 14 can be closed by hand wheel 319. The engine is now ready to start.

Starting is effected with the speed control valve 100 (see Fig. 5) by admitting fluid to the hydraulic motor 110 through the valve 118, or if a speed control valve such as shown in Fig. 14 is used, by opening it with the hand wheel 319. In order to stop the engine the speed control valve 100 is placed in closed position. Whereas all internal combustion engines known are stopped by cutting off the fuel supply, the engine described in this invention can be stopped without cutting off the fuel supply.

To explain this feature reference is made to the rest period explained in preceding paragraphs. If the speed control valve is in closed position and as long as it is kept in this position, the engine pistons will be retained in their outward position. Therefore, under normal operating conditions, the engine pistons will always stop in the outward position. If under abnormal conditions the engine pistons should stop in their inner position, that is, the position shown in Fig. 1, they will have to be moved to starting position by compressed air, as explained, before starting can be effected.

*Constant volume of fluid in hydraulic system.*—An important consideration for continuous successful operation of the engine-compressor unit is the provision of means to maintain a constant volume of fluid in the hydraulic system of the engine.

Referring to Fig. 18, it will be noted that one-half of the unit shown in Fig. 1 is illustrated with particular regard to the hydraulic system. The same reference numerals are used in Fig. 18 as in Fig. 1 for the same parts.

An arm 130 is rigidly attached to piston pin 81 and has a link 131 attached to its free end. This link is connected to the rocker lever 132 by means of pin 133. A rod 134 is mechanically connected to the compressor piston 17 as shown in Fig. 19. Rod 134 carries arm 135 and the free end of this arm is connected to the rocker arm 132 by means of link 136 which is connected to 132 by pin 137.

A piston valve 138 is slidably fitted into valve body 139 forming the chambers 140 and 141 therein, which are closed off by covers 147 and 148. When in its normal or fully closed position the piston valve 138 overlaps the ports 142 and 143 which are connected together and communicate with port 144, leading to the accumulator chamber 70, which forms part of the hydraulic system of the engine. Furthermore, chamber 146 is connected by means of passage 145 to a source of supply of fluid under pressure. This source of supply 177 is shown in Fig. 21. Chamber 141 opens to a sump by means of port 146. The piston valve is attached to the rod 149 to which is pivoted the rocker arm 132 by means of fulcrum pin 150. The pin 150 is located at such a point of the rocker arm 132 that the length ratio 150—133 to 150—137 is the same as the ratio between the length of stroke of the accumulator piston 74 and the length of stroke of pistons 5, 17 and 39. Therefore, it will be understood that as long as the volume of liquid in the hydraulic system positioned between the accumulator piston 74 and the hydraulic piston 39 is such as to result in the positions for pistons 74, 5, 17 and 39 as shown in Fig. 18, the fulcrum point 150 will assume the position shown in Fig. 18 and will remain in this position while the engine and accumulator pistons reciprocate, provided that the volume of the fluid in the hydraulic system remains unchanged. Should the volume of liquid be decreased, for instance, on account of leakage, then the fulcrum pin 150 will move in the direction indicated by arrow 151, resulting in an axial movement of the piston valve 138 in the same direction, uncovering port 142 and permitting fluid under pressure to enter into the chamber 70, resulting in an increase in volume of the fluid in the hydraulic system. As the volume increases, the fulcrum point 150 and valve 138 will move in the direction 152 until the piston 138 closes the port 142, at which time the volume of the fluid in the hydraulic system is restored to normal. Should the volume of the fluid in the hydraulic system be increased above normal, then fulcrum point 150 will move in direction 152 causing the piston valve 138 to uncover port 143 which will result in a drainage of fluid from chamber 70 into the sump, since the liquid in the hydraulic system is under pressure at all times when the engine is in operating condition. This drainage is terminated by movement of pin 150 to its normal position as shown in Fig. 18.

Referring to Fig. 19, it will be noted that the rod 134, also shown in Fig. 18, is attached mechanically to the inner end of the compressor piston 17 by means of the hook 155 and slides in guides 156. Openings 157 in casing 9 permit movement of arm 135 which protrudes outside the casing 9. The apparatus to control the volume of the fluid in the hydraulic system, shown in Fig. 18, is also employed to perform the same duty for the other half of the engine-compressor unit. In Fig. 19, rod 134' serves to actuate this apparatus. Later on in the specifications, reference will again be made to Fig. 19 to explain the remaining parts. In Fig. 20, is illustrated how the arm 130 referred to in Fig. 18, is attached to the accumulator piston pin 81.

*Fuel system.*—In Fig. 21, the fuel injection pump 160 is of well known construction and supplies fuel under pressure to the spray-nozzle 7, Fig. 1. The fuel pump is actuated by tappet 161 which rides on the cam segment 162. This cam segment 162 is pivoted by pin 163 held in the sides of casing 164. A connecting link 165 is pivoted to the cam segment 162 by means of pin 166 on one end and its other end is pivoted to rocker arm 84 by pin 86. It will be remembered that rocker arm 84 is oscillated by the accumulator pistons 74 and 74', by means of the rods 85 and 85'. In Fig. 21 the rocker arm 84 is shown in the position which corresponds to the inner position of the engine pistons 5 and 5', Fig. 1. It will also be noted that the cam segment 162 has terminated its oscillation in the direction indicated by arrow 167 and that the tappet 161 has been brought to its highest position by the cam nose 168, which forms part of the perimeter of the cam segment 162. In other words, the fuel pump is being or has just been actuated and fuel is being or has just been injected into the engine cylinder. On the subsequent expansion stroke of the engine pistons, the accumulator pistons will move forward, and oscillate the rocker arm 84 in the direction indicated by arrow 169. The amount of oscillating movement is indicated by angle 170. The cam segment 162 will also oscillate about pin 163, so that the tappet 161 will follow the cam nose 168 downward, thus effecting the suction stroke of the fuel pump.

Also illustrated in Fig. 21, is the fluid makeup pump 175 which is of the well known plunger type. It is actuated by the plunger rod 176 which is connected to one of the piston pins 81' of the accumulator piston 74'. Fluid under pressure is pumped into the constant pressure chamber 177 which is attached to the outlet of pump 175. Constant pressure of the fluid is obtained by means of the spring-loaded relief valve 178, of known construction. An outlet 179 is provided in 177 and serves to transfer fluid under pressure to the various auxiliaries, some of which have been described already.

A very important consideration in connection with the fuel injection pump 160 is the regulation of the amount of fuel pumped and injected into the engine cylinder for each power stroke of the engine.

In the type of fuel injection pump shown, means for regulating the amount of fuel pumped are provided in the form of the control rod 171 which can be moved axially, the arrow 172 indicating the direction of movement resulting in an increase of the amount of fuel pumped. Pin 173 on control rod 171 serves to form the connection of this control rod with the governor apparatus, which will now be described.

A bracket 180, attached to the accumulator 71, carries two cylinders 181 and 182, into which are slidably inserted pistons 183 and 184, the piston rods 185 and 186 protruding through the closed upper ends of the cylinders 181 and 182, respectively. Pivoted to the end of the rods 185 and 186, by means of pins 188 and 189, is the differential link 187. At a fixed point 190 of the differential link 187 is pivotally attached the connecting rod 191, the other end of which is connected by pin 193 to one arm of bell-crank 192. The other arm of 192 is slotted to fit 173 and moves control rod 171. The chamber 195 of cylinder 181 has an opening 196 which serves to admit air from the air compressor receiver 99, Fig. 1, thus exerting at all times the air pressure in the receiver upon piston 183. This pressure is counteracted by spring 197 and the spring will be compressed more with an increase in air pressure in chamber 195, so that a certain predetermined normal position of the piston 183 results from a certain fixed and predetermined air pressure in the air receiver. Also the linkage connecting piston 183 with the fuel pump control rod is adjusted so that a certain fixed and predetermined amount of fuel is injected into the engine corresponding to a certain fixed and predetermined air pressure in the air receiver.

In the foregoing description of the governor apparatus, it has been assumed that point 189 remained in a fixed position, for instance, that shown in Fig. 21. That being the case, it is obvious that an increase of air pressure in the air receiver will result in an increased amount of fuel injected into the engine.

Though the injection of fuel, when regulated by the air pressure in 99, is accurate, it has been found that it is not accurate enough to assure, at all times and under all operating conditions, the same terminal position of the power stroke of the engine pistons.

In any engine, the power necessary to overcome the internal friction and other losses, varies. For instance, more power is required to compensate for the losses referred to when an engine of the type described is relatively cold than when it has attained its normal working temperature.

Therefore, the auxiliary cylinder 182 is provided to give an auxiliary fuel regulation to compensate for the variation of the amount of power lost in the engine under varying operating conditions. Variations in frictional and other losses in the engine will result in a variation of the length of piston stroke and particularly in a variation of the terminal position of the engine pistons at the end of the power stroke.

Chamber 200 of cylinder 182 is filled with fluid under pressure and this pressure, acting on the underside of piston 182, is counter-balanced by the adjustable spring 201. Piping 202 connects chamber 200 with the valve block 203, which is preferably mounted on the side of the engine casing 9. A valve spindle 204 is slidably fitted into the valve block 203, and is reciprocated by means of the arm 205 and the tubular rod 206, which latter is mechanically attached to piston 17 as shown in Fig. 19.

An annular groove 207 is provided in valve spindle 204 and four annular grooves are provided in valve block 203. Groove 208 connects with passage 209, to which is connected the fluid supply tubing 179. Grooves 210 and 211 are in communication with tubing 202 by means of passages 212 and 213. Groove 214 is connected to the sump. The length 215 of groove 207 is greater than the distances 216 and 217 between the grooves 208 and 210, and 211 and 214 respectively.

Therefore, if the valve spindle 204 moves in the direction of arrow 218, the groove 207 will first permit fluid under pressure to pass into chamber 200 by means of passages 209, 212 and tubing 202, and then allow fluid under pressure contained in chamber 200 to pass from this chamber into the sump by way of tubing 202, and the passages 213, 211, 214 and 219. While the spindle valve 204 returns to the position indicated in Fig. 21, corresponding action of draining and filling chamber 200 will take place and, at the time of the engine cycle when fuel injection occurs, piston 184 will have assumed a fixed predetermined position. It is evident that an increase in volume of chamber 200, and a corresponding upward movement of piston 184, will take place only when the amount of fluid transferred into chamber 200 is greater than the amount of fluid drained therefrom.

Fig. 22 represents velocity-stroke diagrams of the valve spindle 204, indicating the velocity of the valve spindle at various positions during the expansion stroke of the engine, whereas Fig. 23 illustrates the same type of diagrams during the compression stroke of the engine.

The same numerals and letters are employed in Fig. 23 as are used in Fig. 22 for corresponding curves, points and values but the numerals and letters in Fig. 23 are provided with the index '. For instance, curve 220' in Fig. 23 corresponds to curve 220 in Fig. 22. In Figs. 22 and 23 curves 220 and 220' represent the normal velocity curves of the valve spindle 204, which indicate that the valve spindle, and therefore also the engine pistons, come to a stop at 222, which is assumed to be the point of normal termination of the expansion stroke and incidentally the point of normal beginning of the compression stroke.

Curves 223 and 223' indicate a velocity higher than normal resulting in a longer engine stroke, as indicated by point 224, and curves 225 and 225' show a velocity slower than normal, resulting in a shorter engine stroke as indicated by point 226. Now, 227 represents the portion of the stroke of the valve spindle 204 during which groove 207 permits filling of chamber 200, and is therefore termed "filling period", while 228 designates the portion of the stroke during which groove 207 permits draining of chamber 200 and is therefore termed "draining period". It will be noted that the mean piston velocities $V_1$, $V_2$ and $V_3$, during the filling periods 227 and 227', do not vary much from one another whereas a distinct difference in magnitude may be observed between the mean piston velocities $V_4$, $V_5$, and $V_6$ during the draining periods 228.

The duration of the filling and draining periods 227 and 228, and the adjustment of spring 201, are such that with a normal length of stroke, and with the velocities of the valve spindle 204 following curves 220 and 220', the amount of fluid transferred into chamber 200, during the filling periods 227 and 227', is equal to the amount of fluid drained from 200, during the draining periods 228 and 228', so that there is no change in position of point 189 and consequently no change in fuel regulation.

If, however, the piston stroke should be shorter than normal and the velocity of the valve spindle should follow curves 225 and 225', respectively, then the largely decreased mean velocities $V_6$ and $V_{6'}$ would result in a longer duration of the draining periods 228 and 228', whereas the duration of the filling periods 227 and 227' would not be prolonged in proportion, due to the relatively small decrease in mean velocity $V_3$ and $V_3'$. Therefore the volume of fluid in chamber 200 would decrease, resulting in a downward movement of piston 184, which would bring about an increase in the amount of fuel injected, so that the subsequent expansion strokes would terminate again at the normal point 222.

If, however, the stroke of the engine pistons should become greater than normal, the mean piston velocities $V_3$ and $V_{3'}$, during the draining periods 228 and 228', would increase decidedly above normal, whereas the mean velocities $V_2$ and $V_{2'}$, during the filling periods 227 and 227', are not in the same proportion above normal as $V_3$ and $V_{3'}$. Therefore, the filling periods 227 and 227' would not be decreased in proportion to the draining periods 228 and 228' and an increase in volume of fluid in chamber 200 would result, bringing about upward movement of piston 184 and a decrease in amount of fuel injected into the engine cylinder, so that subsequent expansion strokes would terminate again at their normal point 222.

*Controlled engine overstroke.*—Now, referring to Figs. 1 and 4, it has been explained that the free end of piston 39 will enter into the pocket 42.

Under normal operating conditions, the engine stroke is terminated before piston 39 enters pocket 42 appreciably, but it may, under abnormal conditions, do so. Referring to Fig. 4, it will be noted that one or more narrow grooves 97 are cut longitudinally on the circumference of the extension of piston 39. These grooves are of such cross-sectional area that the fluid trapped in pocket 42, under a high pressure, shall escape at a controlled variable rate of flow, whereby the fluid pressure in pocket 42 may be held substantially constant during the period of over-stroke.

The same means are employed to terminate the outward stroke of the accumulator pistons in case they tend to over-stroke; see 76, 77, 78 and 79 of Fig. 1. In other words, the design shown in detail in Figs. 1 and 4, absorbs the excess energy of expansion and brings the pistons to a controlled stop, should the energy developed in the engine cylinder 6, or accumulator cylinder 72, become excessive.

*Hydraulic pump application.*—Figs. 24 and 25 illustrate the application, for pumping of liquids, of an opposed free piston engine of the type already described. The engine proper is constructed in every detail exactly like the engine illustrated in connection with the air compressor. For reasons of simplicity, only one-half of the engine pumping unit is illustrated, this unit being constructed symmetrically about line C—C. The engine piston 5 and the scavenging air piston 230 are preferably made integral and the flat annular shoulder 231 of the piston 230 carries the pump plunger rods 232, which are attached to 231 by bolts 233. Preferably two or more pump plungers 234 are employed. These plungers are of known construction and are fitted into pump cylinders 235 which are fitted into cylinder head 236 and bolted thereto by bolts 237 shown in Fig. 25. A common manifold 238 connects the two pump cylinders 235 and is attached thereto by bolts 239. Suction valves 240 and discharge valves 241, of known construction, are fitted opposite each other in the middle of manifold 238, and are best shown in Fig. 25. The discharge pipe 242 leads to a liquid receiver, not shown on the drawing, but the use and arrangement of which, is well known in the art. The construction of cylinder head 236 differs from that of cylinder 14, shown in Figs. 1 and 2, only in that it does not have any inlet and outlet valves 15 and 16 but carries the pump cylinders 235. The construction of the extended portion 243 of the cylinder head 236 differs from the construction of the so-called ram 19 in that it does not carry any seal rings 21, as shown in Fig. 1. Therefore, chambers 244 and 245 communicate with each other through the annular clearance space 246, formed between the outer diameter of the extension 243 and the inner bore of piston 5. The chambers 244 and 245 are preferably vented to the atmosphere. The cylinder head 236 is held against the engine casing 9, which is of the same construction as Fig. 1, in the same manner as the cylinder head 14, namely by tie-rods 46 shown in Fig. 25. The operation of the engine pumping unit is the same as that of the compressor unit, and auxiliaries necessary for operation are the same as already illustrated and described. In the governor apparatus, illustrated in Fig. 21, and in the speed control apparatus, illustrated in Figs. 5, 6, 7, 8, 9 and 10, the chambers 195 and 123, respectively, are filled with liquid under pressure and are in communication with the liquid receiver referred to above, which latter is connected to the discharge pipe 242 illustrated in Fig. 24.

*Locomotive application.*—Fig. 29 illustrates the application of a free-piston engine-compressor unit to produce the driving medium for operation of a piston-type locomotive drive. A chassis 325, has wheels 326 which are driven by the cylinders 327 provided with the customary valve gear and reciprocating pistons connected to the wheels by rods 328.

The driving medium for the cylinders 327 is compressed air which is produced by the engine-compressor unit 329, which is of the construction shown in Figs. 1 to 23. The compressed air is stored in the receiver 330, entering the latter through pipe connection 331. Pipe connection 332 serves as inlet for the compressed air to the cylinders 327 and pipe 333 as outlet or exhaust pipe from the cylinders.

Pipe 334 is the exhaust pipe for the internal combustion engine which forms part of the engine-compressor unit 329.

A plurality of engine-compressor units 329 may be employed instead of a single unit.

In Fig. 30, a plurality of engine pumping units 335 are used to supply liquid under pressure for use in a hydraulic motor 336 of known construction. This motor 336 drives the wheels 337 of the chassis 338 of a vehicle for traction purposes, such as a locomotive. Liquid, such as oil, is supplied under high pressure from the engine pumping units 335 into a high pressure receiver 339, by means of the manifold 340, and is then transferred, by means of pipe connection 341, into the hydraulic motor 336. After having delivered its energy to the hydraulic motor 336, the liquid leaves the hydraulic motor at a reduced pressure and is discharged by means of pipe 342 into the low pressure receiver 343, whence it will again enter the pump cylinder of the engine pumping units 335 by means of the inlet pipes 344. Therefore the same liquid is being circulated continuously.

Simultaneous speed control of the four units 335 can be obtained by the use of a speed-control valve as shown in Fig. 11 or by separate speed-control valves 345, coupled together by shafts 346 and driven by a common motor 347, Fig. 30.

The same arrangement of high-pressure and low-pressure receivers can be used in connection with the application of engine-compressor units to produce a driving medium suitable to propel a vehicle for traction purposes. The advantage of the high-pressure and low-pressure receivers will be obvious to those skilled in the art of expansion engines for traction purposes, when considering that, when a late cut-off is used in the expansion engine, the exhaust pressure of this engine is excessively high and represents a total waste of energy unless double, triple or quadruple expansion is employed, which, however, results in a very intricate and costly expansion engine.

In the case of a late cut-off in the expansion engine the pressure in the low-pressure receiver may be nearly equal to the exhaust pressure of the expansion engine and during the suction stroke of the air compressor, for instance, air under pressure will fill the compressor cylinder thus eliminating any substantial loss when the air is leaving the expansion engine.

If a driving medium of great density, such as a liquid is employed in an application such as shown in Fig. 30, the power output of the motor 336 can be regulated by varying the power output of the engine, the discharge pressure of the liquid leaving the motor being maintained as nearly constant as possible. The liquid exhausted from the motor is forced into the pump-cylinder of the engine-pumping units 335 resulting in good volumetric efficiency. This makes possible the operation of engine-pumping units at an unusually high speed for a reciprocating pump.

From the foregoing it is evident that locomotive service demands great flexibility in power and speed of the power unit, and it was particularly with regard to the exacting requirements of economy, compactness and wide variations of power and speed, which have to be met in locomotives, that the present invention was evolved.

It will be understood that the use of italicized captions herein is merely for the purpose of making it easier to follow the disclosure and is not to be considered as limiting the invention in any way.

It will be obvious to those skilled in the art that various changes may be made in the devices and arrangement thereof as illustrated in the drawings without departing from the spirit of the present invention as set forth in the appended claims and we therefore do not limit ourselves to what is shown in the drawings and described in the specifications.

We claim:—

1. In an opposed free piston internal combustion engine, the combination of a reciprocating pump driven by an engine piston, an engine accumulator containing pistons for effecting the compression strokes of the engine pistons, fluid connections between the accumulator pistons and the engine pistons whereby the pressure in the accumulator is communicated to the engine pistons to effect the compression strokes thereof and means for synchronizing the movements of the accumulator pistons.

2. In a free piston internal combustion engine, the combination of a reciprocating pump driven by the engine piston, an engine accumulator containing an elastic medium, means whereby the expansion stroke of the engine piston compresses the medium in the accumulator and whereby the expansion of the medium in the accumulator effects the compression stroke of the engine piston, and valve mechanism for varying the interval between successive strokes of the engine piston.

3. In a free piston internal combustion engine, the combination of a reciprocating pump driven by the engine piston, an engine accumulator containing an elastic medium, means whereby the expansion stroke of the engine piston compresses the medium in the accumulator and whereby the expansion of the medium in the accumulator effects the compression stroke of the engine piston, and means for regulating the terminal position of the engine piston at the end of the expansion stroke.

4. In a free piston internal combustion engine, the combination of a reciprocating pump driven by the engine piston, an accumulator containing an elastic medium, means whereby the expansion stroke of the engine piston compresses the medium in the accumulator and whereby the expansion of the medium in the accumulator effects the compression stroke of the engine piston, a fuel supply for the engine, and means for adjusting the fuel supply to maintain normal length of the expansion stroke of the engine piston.

5. In a free piston internal combustion engine, the combination of two or more engine cylinders, reciprocating pumps driven by the engine pistons, means for injecting fuel into the engine cylinders, means including an engine accumulator for effecting the compression stroke of the engine pistons, and valve mechanism for controlling the compression means to regulate the interval between corresponding piston strokes in the several engine cylinders.

6. In a free piston internal combustion engine having piston and cylinder elements adapted to have compression and expansion strokes, the combination of a reciprocating pump driven by the engine, a plunger connected to the engine piston, an engine accumulator containing an elastic medium under pressure, a piston associated with said accumulator for effecting the compression stroke of the engine piston, and a passage between the accumulator piston and the plunger containing fluid under pressure whereby the pressure of the elastic medium in the accumulator is communicated to the engine piston during both expansion and compression strokes thereof.

7. In a free piston internal combustion engine, the combination of an engine cylinder, a pump cylinder, a third cylinder separate from the other two, a differential piston having an element reciprocating in the engine cylinder to receive the force of expansion, a second element of said differential piston reciprocating in the pump cylinder to pump fluid to a point external of the engine and a third element of said differential piston reciprocating in the said third cylinder to circulate fluid within the engine, thereby to effect the compression stroke of the engine piston and to effect the rest period of the engine piston.

8. In a free piston internal combustion engine, the combination of an engine cylinder, a pump cylinder, a third cylinder separate from the other two, an engine accumulator, a fluid passage connecting one end of said third cylinder to the accumulator, a second fluid passage connecting the other end of said third cylinder to the accumulator, and a valve in said second passage to control the flow of fluid therein and thereby to regulate the duration of the rest period of the engine.

9. In a free piston internal combustion engine, the combination of an engine cylinder for developing the energy of combustion, a pump cylinder for pumping fluid, a third cylinder for pumping air for scavenging the engine cylinder, and a differential piston reciprocating in all of said cylinders whereby fluid is expelled from the pump cylinder on the expansion stroke of the piston and scavenging air is expelled from said third cylinder on the compression stroke of the piston.

10. In a free piston internal combustion engine, the combination of a piston actuated in a forward direction by the energy of combustion and in a backward direction by fluid pressure, a second piston, a chamber behind said second piston to which fluid is admitted during the forward stroke and from which fluid is discharged during the backward stroke thereof, and means for controlling the discharge of fluid from said chamber to restrain the backward stroke of the piston.

11. In a free piston internal combustion engine, the combination of a cylinder, a reciprocating piston therein moved forward by the energy of combustion, an engine accumulator containing an elastic medium under pressure, a reciprocating piston in the accumulator one side of which is exposed to the pressure of the elastic medium, and a fluid column interposed between the two pistons whereby the forward stroke of the first named piston compresses the elastic medium in the accumulator and whereby the subsequent expansion of the elastic medium in the accumulator effects the backward stroke of the first named piston.

12. In a free piston internal combustion engine, the combination of a cylinder and a reciprocating piston therein, an engine accumulator and a reciprocating piston therein, a reciprocating column of fluid between the two pistons whereby they are moved in unison and in a predetermined relation to each other, and means for maintaining a constant quantity of fluid in said fluid column to maintain the predetermined relation between the pistons, said means including supply and exhaust connections to the fluid column controlled by a valve responsive to any deviation of the relative position of the pistons from the predetermined relative position thereof.

13. In a free piston engine having expansion and compression strokes, the combination of an engine cylinder containing a reciprocating piston, an engine accumulator containing a reciprocating piston and an elastic medium under pressure acting thereon, means for reciprocating the pistons in unison including a fluid column, and means for maintaining a constant minimum pressure of the elastic medium in the accumulator thereby to control the minimum force transmitted by the accumulator piston through the fluid column to the engine piston.

14. In a free piston internal combustion engine, the combination of an engine cylinder containing a reciprocating piston adapted to have an expansion stroke terminating at a predetermined point, means for supplying fuel to said cylinder to effect the expansion stroke of said piston, a fluid pump driven by said piston, a receiver connected to said pump in which is affected by the rate of discharge of fluid from said pump into said receiver, a valve mechanism actuated by fluctuations of pressure in said receiver to increase the supply of fuel to said cylinder when the pressure in said receiver rises above a predetermined pressure and to reduce the supply of fuel to said cylinder when the pressure in said receiver falls below said predetermined pressure thereby tending to prevent understroking and overstroking respectively of said piston in respect to said predetermined point of termination of stroke thereof, and additional valve means actuated by understroking or overstroking of said piston whereby the supply of fuel to said cylinder is additionally adjusted to effect an expansion stroke of said piston which terminates at the aforesaid predetermined point.

15. In a free piston internal combustion engine, the combination of an engine cylinder containing a reciprocating piston adapted to have expansion and compression strokes, means for supplying fuel to said cylinder to effect the expansion stroke of said piston, a fluid pump driven by said piston, fluid pressure means including valve mechanism for effecting a rest period between strokes of said piston, and means of increasing or decreasing the duration of said rest period responsive to an increase or decrease, respectively, of the quantity of fluid pumped as compared with a predetermined quantity required to be pumped.

16. In an internal combustion engine, the combination of an engine cylinder containing a piston adapted to have alternate expansion and compression strokes with a rest period at the end of the expansion stroke, means including a source of pressure and connections thereto for applying fluid pressure continuously against the engine piston to effect the compression stroke thereof upon completion of the rest period, means for applying fluid pressure to the piston in the opposite direction to resist compression including a valve for the control therefor to effect the rest period, and means to actuate said valve including a speed control valve adapted to vary the duration of the rest period.

17. In an internal combustion engine, the combination of an engine cylinder containing a piston adapted to have alternate expansion and compression strokes with a rest period at the end of the expansion stroke, means for applying fluid pressure to the piston to resist compression including a valve for the control thereof to effect the rest period, means for closing said valve before the end of the expansion stroke and holding it closed during the rest period, and means for opening said valve to terminate the rest period and thereby to start the compression stroke of the engine piston.

18. In an internal combustion engine, the combination of an engine cylinder containing a piston adapted to have a normal expansion stroke ending at a predetermined terminal point, means for supplying fuel to the cylinder to effect the expansion stroke of the piston, and means responsive to deviations of the end of the piston stroke from the predetermined terminal point adapted to reduce the fuel supply when the piston is overstroking and to increase the fuel supply when the piston is shortstroking, thereby substantially maintaining the predetermined normal stroke of the piston.

19. In an expansion engine having expansion and compression strokes, the combination of an engine cylinder containing a reciprocating piston, a second cylinder and a piston reciprocating therein in unison with the engine piston, ports in said second cylinder whereby fluid enters one end and is displaced from the other end thereof during said strokes of said second piston, a valve for bypassing fluid displaced from the forward end of said second cylinder to the back end thereof during the expansion stroke of the engine, and an engine controlled valve adapted to allow fluid to be displaced from the back end of said second cylinder to the forward end thereof during the compression stroke of the engine and to restrain the escape of said fluid from the back end of said cylinder during the interval between the end of the expansion stroke and the beginning of the compression stroke of the engine thereby to vary the number of piston strokes per minute.

GILBERT V. ANDERSON.
ALBERT T. BREMSER.